(12) United States Patent  
Tian et al.

(10) Patent No.: US 9,680,555 B2
(45) Date of Patent: Jun. 13, 2017

(54) APPARATUS AND METHOD FOR MULTIPLE ANTENNA SYSTEMS

(71) Applicant: Nokia Technologies Oy, Espoo (FI)

(72) Inventors: Ruiyuan Tian, Espoo (FI); Joonas Krogerus, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/969,655

(22) Filed: Dec. 15, 2015

(65) Prior Publication Data

US 2016/0173184 A1 Jun. 16, 2016

(30) Foreign Application Priority Data

Dec. 16, 2014 (GB) ................................. 14198386.6

(51) Int. Cl.
| | | |
|---|---|---|
| *H04L 1/02* | (2006.01) | |
| *H04B 7/06* | (2006.01) | |
| *H01Q 21/00* | (2006.01) | |
| *H01Q 21/28* | (2006.01) | |
| *H01Q 21/30* | (2006.01) | |
| *H04B 1/18* | (2006.01) | |
| *H04B 7/08* | (2006.01) | |

(52) U.S. Cl.
CPC ....... *H04B 7/0697* (2013.01); *H01Q 21/0006* (2013.01); *H01Q 21/28* (2013.01); *H01Q 21/30* (2013.01); *H04B 1/18* (2013.01); *H04B 7/0617* (2013.01); *H04B 7/0691* (2013.01); *H04B 7/086* (2013.01); *H04B 7/0874* (2013.01)

(58) Field of Classification Search
CPC ......... H04L 1/0618; H04L 1/06; H03J 1/0008
USPC .......... 375/267, 260; 455/214, 337; 342/368
See application file for complete search history.

(56) References Cited

U.S. PATENT DOCUMENTS

| | | |
|---|---|---|
| 4,165,497 A | 8/1979 | Irons |
| 4,517,572 A | 5/1985 | Dixon |
| 6,405,018 B1 | 6/2002 | Reudink et al. |
| 8,547,282 B2 | 10/2013 | Park et al. |
| 2007/0041457 A1 | 2/2007 | Kadous et al. |
| 2010/0039325 A1 | 2/2010 | van Rooyen et al. |
| 2010/0272204 A1 | 10/2010 | Fazel et al. |
| 2011/0235755 A1 | 9/2011 | Yang et al. |
| 2014/0227982 A1 | 8/2014 | Granger-Jones et al. |
| 2016/0049924 A1* | 2/2016 | Broyde .............. H01Q 21/0006 343/745 |

(Continued)

OTHER PUBLICATIONS

Chiu et al; "Reconfigurable Multi-port Antennas for Handheld Devices"; IEEE Antennas and Propagation Society International Symposium, 2009, APSURSI '09; Jun. 1-5, 2009; pp. 1-4.

(Continued)

*Primary Examiner* — Khai Tran
(74) *Attorney, Agent, or Firm* — Harrington & Smith (57) ABSTRACT

An apparatus including a plurality of radio ports for interconnection with radio circuits, a plurality of antenna ports for interconnection with antennas, interconnection circuitry configured to enable interconnection of each of one or more radio ports to different non-overlapping sets of P antenna ports, where P is controllable and $P=2^p$, p being a whole number; and at least one control port configured to receive a control signal for determining P.

15 Claims, 4 Drawing Sheets

(56) References Cited

U.S. PATENT DOCUMENTS

2016/0100388 A1* 4/2016 Frenne ................ H04L 5/001
                                                    370/330
2016/0164592 A1* 6/2016 McGowan .......... H04B 1/0483
                                                    455/101

OTHER PUBLICATIONS

Martens et al.; "Inductive and Capacitive Excitation of the Characteristic Modes of Small Terminals"; 2011 Loughborough Antennas 8, Propagation Conference; Nov. 14-15, 2011; Loughborough, UK; IEEE; pp. 1-4.
Cetiner et al.; "A MIMO System With Multifunctional Reconfigurable Antennas"; IEEE Antennas and Wireless Propagation Letters, vol. 5, 2006; pp. 463-466.
Safarian et al.; "CMOS Distributed Active Power Combiners and Splitters for Multi-Antenna UWB Beamforming Transceivers"; IEEE Journal of Solid-State Circuits, vol. 42, No. 7, Jul. 2007; pp. 1481-1491.

* cited by examiner

APPARATUS AND METHOD FOR MULTIPLE ANTENNA SYSTEMS

TECHNOLOGICAL FIELD

Embodiments of the present invention relate to an apparatus and/or a method for multiple antenna systems.

BACKGROUND

Multiple antenna systems may be used in a number of different applications.

A system may, for example, be configured to operate the multiple antennas simultaneously.

A multiple antenna system may, for example, have multiple different antennas configured to operate at different frequencies or so that the system can operate in different frequency channels.

A multiple antenna system may, for example, have multiple different antennas configured to operate in orthogonal channels created by orthogonal signal encoding.

A multiple antenna system may, for example, have multiple different antennas configured to operate simultaneously in the same channel.

Diversity may be introduced between the multiple antennas by, for example, arranging the antennas so that they have diversity arising from different orientations and/or spatial separation.

The application of these various techniques may, for example, be used to create multiple input (MI), multiple output (MO) and multiple input multiple output (MIMO) systems.

A MO system may, for example may be used for beam-forming, spatial multiplexing or diversity transmission. A MI system may, for example be used for determining a bearing (reverse beam-forming), spatial multiplexing reception or diversity reception.

It would be desirable to improve multiple antenna systems.

BRIEF SUMMARY

According to various, but not necessarily all, embodiments of the invention there is provided an apparatus comprising:

a plurality of radio ports for interconnection with radio circuits, a plurality of antenna ports for interconnection with antennas, interconnection circuitry configured to enable interconnection of each of one or more radio ports to different non-overlapping sets of P antenna ports, where P is controllable and $P=2^p$, p being a whole number; and at least one control port configured to receive a control signal for determining P.

The circuitry may be configured to interconnect each antenna port to one of the plurality of radio ports irrespective of the value of P.

The interconnection circuitry may be configured to enable compensated interconnection of each of one or more radio ports to different non-overlapping sets of P antenna ports to enable controlled combination of signals travelling via a shared radio port.

The interconnection circuitry may be configured to provide different filters between different pairs of radio ports and antenna ports, to enable compensation in respect of multiple antenna ports interconnected to a shared radio port.

The filters may comprise passive/tunable/adaptive impedance matching elements.

The interconnection circuitry may be configured to provide different phase compensation between different pairs of radio ports and antenna ports, to enable phase compensation in respect of multiple antenna ports interconnected to a shared radio port.

The interconnection circuitry may be configured to provide programmable phase compensations between different pairs of radio ports and antenna ports.

The interconnection circuitry may comprise one or more selection circuits, each selection circuit comprising first ports and second ports and configured to adopt a first configuration defined by one to one mappings between the first ports and the second ports, and configured to adopt a second configuration defined by 1 to $2^q$ mappings between the first ports and the second ports, where q is a non-negative integer, wherein the at least one control port is configured to receive a control signal for controlling configurations of the one or more selection circuits.

One or more of the selection circuits may be configured, in the second configuration, to provide phase modification to signals mapped via at least some of the $2^q$ mappings.

The interconnection circuitry may comprise a cascade arrangement of selection circuits, wherein each selection circuit comprises two first ports and two second ports and is configured to have a first configuration defined by one to one mappings between each of the two first ports and each of the two second ports and configured to have a second configuration defined by a 1 to 2 mapping between one of the two first ports and the two second ports.

The cascade arrangement may comprise: a radio tier of one or more selection circuits having each of the two first ports connected to a different radio port and each of the two second ports is connected to a first port of different selection circuits in an adjacent lower order tier of selection circuits; and an antenna tier of multiple selection circuits having only one of the two first ports connected to a radio port, the other of the two first ports being connected to a second port of a selection circuit in an adjacent higher order tier and having each of the two second ports connected to different antenna ports.

The cascade arrangement may comprise at least one intermediate tier of multiple selection circuits having only one of the two first ports connected to a radio port, the other of the two first ports being connected to a second port of a selection circuit in an adjacent higher order tier and having each of the two second ports connected to a first port of different selection circuits in an adjacent lower order tier.

Each selection circuit may comprise a by-pass configured, in the first configuration, to bypass a splitter and/or combiner element and couple each of the two first ports to respective ones of the two second ports and configured, in the second configuration, to couple one of the two first ports to respective ones of the two second ports via the splitter and/or combiner element. The by-pass may comprise an arrangement of switches configured to control transitions between the first configuration and the second configuration. Each selection circuit may comprise a phase element configured to control a phase introduced between the two second ports. The phase element may have a programmable phase.

The apparatus may further comprise a plurality of antennas each of which is interconnected with an antenna port, wherein the plurality of antennas are configured for diversity. At least some of the antennas may be aligned in orthogonal directions and at least some of the antennas are spatially separated. The interconnection circuitry is configured to operate antennas interconnected with a shared radio port as a single virtual antenna. The interconnection circuitry may be configured to operate a plurality (Y) of antennas interconnected via the interconnection circuitry with a shared radio port as a single virtual antenna, for each of multiple (X) radio ports to provide multiple input multiple output, wherein X is controllable.

According to various, but not necessarily all, embodiments of the invention there is provided a method comprising: receiving a control signal; and interconnecting each of one or more operational radio ports to different non-overlapping sets of antenna ports, in dependence upon the control signal.

BRIEF DESCRIPTION

For a better understanding of various examples that are useful for understanding the brief description, reference will now be made by way of example only to the accompanying drawings in which.

DETAILED DESCRIPTION

In a multi-antenna system, it may be desirable to change the number of radio communication channels in use. For example, in some circumstances it may be desirable to have a separate channel for each of the multiple antennas. Whereas in other circumstances it may be desirable to have a reduced number of channels. A channel is typically controlled by a radio circuit that provides the radio frequency signals to an antenna (or antenna's) during transmission and/or receives the radio frequency signals from an antenna (or antennas) during reception. There needs to be some form of interconnection between the radio circuits and the antennas.

In the examples described below, an apparatus 10 has interconnection circuitry 40 that interconnects radio circuits 2 to antennas 4. The interconnection circuitry 40 is configured to interconnect each member of a selected set of the multiple radio circuits 2 to a different non-overlapping sub-set of the multiple antennas 4. The selected set may in some examples be the set of all multiple radio circuits and in other examples may be a sub-set of the multiple radio circuits.

The interconnection circuitry 40 may also be configured such that the sub-set of multiple antennas interconnected to a single radio circuit 2 (single channel) operate as a single virtual antenna. That is the sub-set of multiple antennas operate coherently with a fixed, zero phase offset. If a virtual antenna is transmitting, the radio signals transmitted by the sub-set of antennas are correlated and constructively interfere. If the virtual antenna is receiving, the radio frequency signals provided to the shared radio circuit 2 are correlated. The interconnection circuitry 40 may therefore allow the multiple antenna system to operate the multiple antennas 4 as a variable number of virtual antennas (channels).

Figure 1:
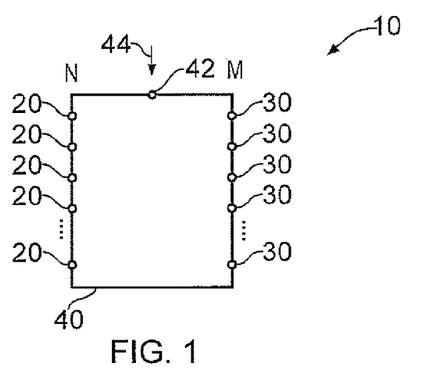
FIG. 1 illustrates an example of an apparatus comprising interconnection circuitry.

FIG. 1 illustrates an example of an apparatus 10 comprising interconnection circuitry 40. The interconnection circuitry 40 comprises a plurality N of radio ports 20 for interconnection with radio circuits 2 and a plurality of M antenna ports 30 for interconnection with antennas 4. The interconnection circuitry 40 is configured to enable interconnection of each of a set of radio ports 20 to different non-overlapping sets of antenna ports 30. The interconnected set of radio ports 20 are controllable and the set of antenna ports 30 are controllable.

The interconnection circuitry 40 comprises at least one control port 42 configured to receive a control signal 44 for determining the sets.

Figure 2:
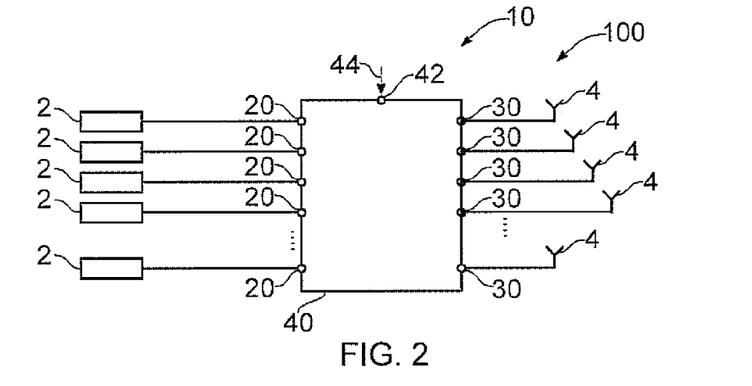
FIG. 2 illustrates the apparatus of FIG. 1 when it is interconnected to multiple radio circuits and to multiple antennas.

FIG. 2 illustrates the apparatus 10 of FIG. 1 when it is interconnected to multiple radio circuits 2 and to multiple antennas 4. Each of the N radio ports 20 is interconnected to a different radio circuit 2. Each of the antenna ports 30 is interconnected to a different antenna 4.

The operation of the interconnection circuit 40 may, for example, be understood in relation to the examples illustrated in FIGS. 3A, 3B, 3C and 3D. In this example, the interconnection circuitry 40 has N radio ports 20, where $N=2^n$ (which may also be expressed as $2^n$), where n is a whole number greater than one. The interconnection circuitry 40 comprises M antenna ports 30 where $M=2^m$ (which may also be expressed as $2^m$), where m is a whole number greater than one. In this document the definition of a whole number is a non-negative integer, for example, 0, 1, 2, 3 . . . .

In this and some other examples M=N. In the illustrated example of FIGS. 3A-3D, M=8 and N=8.

Each of the FIGS. 3A to 3D illustrate a different configuration of the interconnection circuitry 40. In each of the configurations different sets of radio ports 20 are connected to different sets of antenna ports 30. The interconnection circuitry 40 is configured to enable interconnection of each of one or more radio ports 20 to S different non-overlapping sets 50 of P antenna ports. P is controllable by a control signal 44. $P=2^p$ (which may also be expressed as $2^p$), where p is a whole number.

The interconnection circuitry 40 is configured to interconnect each antenna port 30 to one and only one of the plurality of radio ports 20 irrespective of the value of P however, as the value of P increases and the value of S decreases, each of the S radio ports 20 are shared with P antenna ports 30 (S*P=8).

Figure 3A:
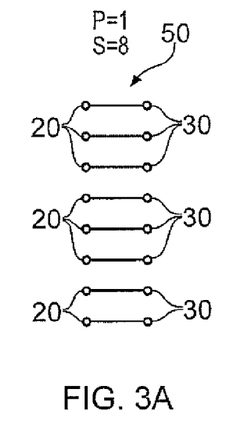
FIGS. 3A to 3D illustrates examples of different configurations of the interconnection circuitry.

In FIG. 3A, there is a one to one mapping between the eight radio ports 20 and the eight antenna ports 30. In this example P=1 and S=8.

Figure 3B:
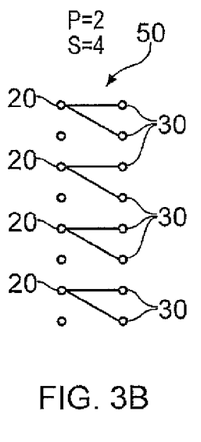

In FIG. 3B, there is a one to two mapping between four of the eight radio ports 20 and the eight antenna ports 30. In this example P=2 and S=4.

Figure 3C:
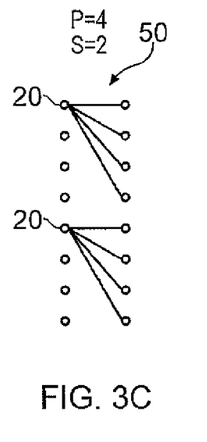

In FIG. 3C, there is a one to four mapping between two of the eight radio ports 20 and the eight antenna ports 30. In this example P=4 and S=2.

Figure 3D:
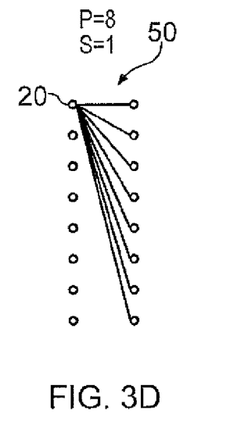

In FIG. 3D, there is a one to eight mapping between one of the eight radio ports 20 and the eight antenna ports 30. In this example P=8 and S=1.

Therefore in general, there is a one to P mapping between S of the N radio ports 20 and the M antenna ports 30. Each of the antenna ports 30 is interconnected to a single one of the radio ports 20 and N=P*S. When S>1, S radio ports are each shared by P different antennas 4.

It will be appreciated that the control signal 44 controls the value of P and the value of S and therefore controls the number S of operational radio ports 20 (number of operational communication channels). The control signal 44 may be adaptively controlled to determine the best suitable values of P and S given different circumstances in which the radio communication is operated. The interconnection circuitry 40 may be configured to enable compensated interconnection of each of the one or more radio ports 20 to different non-overlapping sets of P antenna ports 30 to enable controlled combination of the signals travelling via a shared radio port 20. Thus, for example where a radio port 20 is a shared radio port, the interconnections between that shared radio port 20 and the antenna ports 30 to which it is connected may experience differential phase compensation.

Figure 4A:
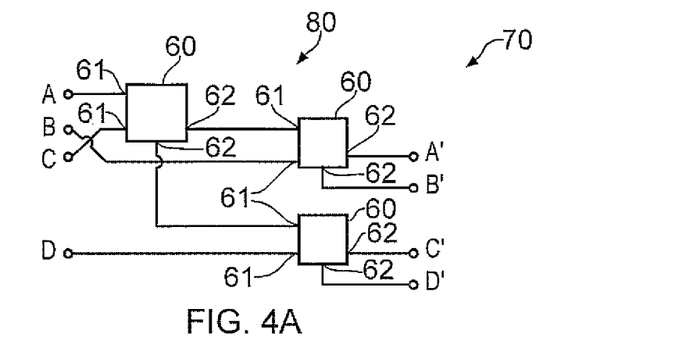
FIG. 4A illustrates an example of a module comprising selection circuits.

The interconnection circuitry 40 may be comprised of one or more selection circuits 60. FIG. 4A illustrates a module 70 comprising selection circuits 60. The module 70 may be used as interconnection circuitry 40 or multiple modules may be used to form interconnection circuitry 40, for example as further described in relation to FIGS. 6A, 6B and 6C below.

Figure 4B:
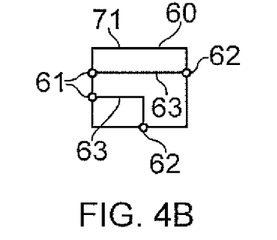
FIG. 4B illustrates an example of a selection circuit in a first configuration.
Figure 4C:
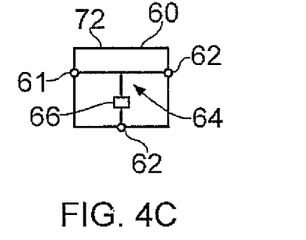
FIG. 4C illustrates an example of a selection circuit in a second configuration.

The module 70 comprises a cascade arrangement 80 of selection circuits 60. Each selection circuit 60 comprises two first ports 61 and two second ports 62. Each selection circuit 60 is configured to have a first configuration 71, as illustrated in FIG. 4B, defined by one to one mappings between each of the two first ports 61 and each of the two second ports 62. Each of the selection circuits 60 is also configured to have a second configuration 72, for example as illustrated in FIG. 4C, defined by a one to two mapping between a first one of the two first ports 61 and the two second ports 62. The second of the first two ports 61 is not connected to a second port 62.

The cascade arrangement 80 comprises a first tier comprising a single selection circuit 60 that has its two second ports 62 interconnected to a first one of the first ports 61 of a first selection circuit 60 in a second, lower order tier and to a first one of the first ports 61 of a second selection circuit 60 in the second, lower order tier. The first ports A, B, C, D of the cascade arrangement 80 are interconnected to the first ports 61 of the selection circuit 60 in the first tier (A, C), to a second of the first ports 61 of a first one of the selection circuits 60 in the second tier (B) and to a second one of the first ports 61 of the second selection circuit 60 in the second tier (D). The second ports of the cascade arrangement A', B', C', D', are provided by the second ports 62 of the first selection circuit 60 in the second tier (A', B') and by the second ports 62 of the second selection circuit 60 in the second tier (C', D').

In this example, the selection circuitry 60 in different tiers may be switched independently between configurations, however, the selection circuitry 60 within a common tier has the same configuration when switched. The different configurations of the cascade arrangement 80 illustrated in FIG. 4A are illustrated in FIGS. 5A, 5B and 5C as mappings between the first ports A, B, C, D and the second ports A', B', C', D'.

Figure 5A:
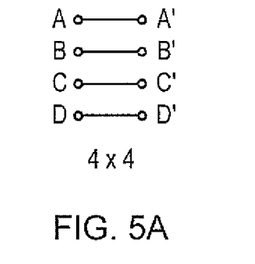
FIGS. 5A, 5B and 5C illustrate different examples of mappings between first ports and second ports of the module for different combinations of selection circuit configurations.

In FIG. 5A, the cascade arrangement 80 of the module 70 has the selection circuitry 60 of the first tier in a first configuration and the selection circuits 60 of the second tier in a first configuration. This results in a one to one mapping between the first ports A, B, C, D and the second ports A', B', C', D'. For example first port A is mapped to second port A', first port B is mapped to second port B', first port C is mapped to second port C' and first port D is mapped to second port D'. The mapping of the first/second ports is therefore 4×4.

Figure 5B:
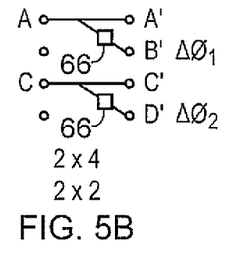

In FIG. 5B, the cascade arrangement 80 of the module 70 has the selection circuitry 60 of the first tier in a first configuration and the selection circuits 60 of the second tier in a second configuration. This results in a one to two mapping between the first port A and the second ports A', B' and between the first port C and the second ports C', D'.

Figure 5C:
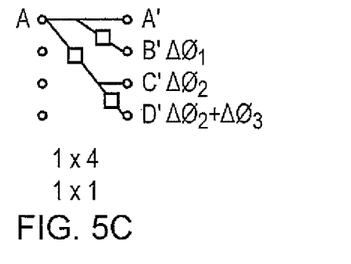

In FIG. 5C, the cascade arrangement 80 of the module 70 has the selection circuitry 60 of the first tier in a second configuration and the selection circuits 60 of the second tier in a second configuration. This results in a one to four mapping between the first port A and the second ports A', B', C', D'.

Referring back to FIG. 4C, for the second configuration, the selection circuitry 60 may be configured to provide differential filtering between the path for the mapping between the first one of the first ports 61 and a first one of the second ports 62 when compared with the path for the mapping between the first one of the first ports 61 and the second of the second ports 62. This is illustrated in FIG. 4C by the presence of a filter 66 in one of the paths but not the other. However, it should be appreciated that both paths may have filters.

The purpose of the filter or filters 66 is to compensate the signals provided via the different paths. This may for example be used such that a set of the second ports of the module 70 operate as a single virtual second port in that the signals are compensated so that they correlate at the first port of the module 70 (for reception) or the second ports of the module (for transmission).

In the example of FIG. 5B, the first port A of the module 70 is mapped to the second ports A', B' of the module 70. The filters 66 provides phase compensation in the path AB'. The path AB' is therefore compensated compared to the path AA' to enable controlled combination of signals travelling via the respective paths.

In the example of FIG. 5C, the first port A of the module 70 is mapped to the second ports A', B', C' and D' of the module 70. The filters 66 provide different phase compensation in the paths AA', AB', AC' and AD'.

In FIG. 5B although there are two physical first ports A, C and four physical second ports A', B', C' and D' such that the first/second mapping may be represented as 2×4 at a physical level. Phase compensation may means that in operation there are in effect two first ports A, C and two virtual second ports. The virtual second port provided by the second ports A', B' maps to the first port A and the virtual port provided by the second port provided by the second ports C', D' maps to the first port C. The first/second mapping may be represented as 2×2 at a virtual level.

Likewise, in FIG. 5C, the mapping of the first/second ports is therefore 1×4 (physically) or if phase compensation is used such that all second ports operate as a virtual port, the mapping is 1×1 (virtually).

From the foregoing, it will therefore be appreciated that the apparatus 10 comprising a module 70 may be configured to provide different phase compensation between different pairs of radio ports 20 and antenna ports 30 to enable phase compensation in respect of multiple antenna ports 30 interconnected to a shared radio port 20.

Referring back to FIG. 4C, the phase compensation provided by the filter 66, which may be a phase delay element, may be programmable via an input control signal. In this way the phase compensation between different pairs of radio ports and antenna ports may be programmable. The phase compensation can also be adaptively determined and programmed based on feedback from other parts of the circuitry.

Figure 6A:
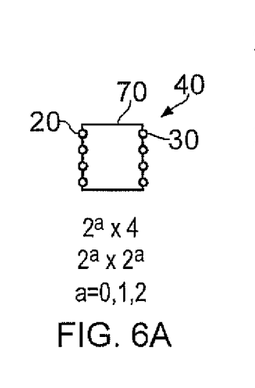
FIGS. 6A, 6B and 6C illustrate examples of different arrangements of interconnection circuitry that can be formed from one or more modules.
Figure 6B:
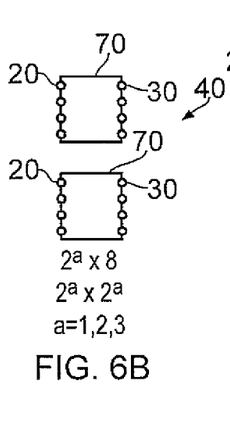
Figure 6C:
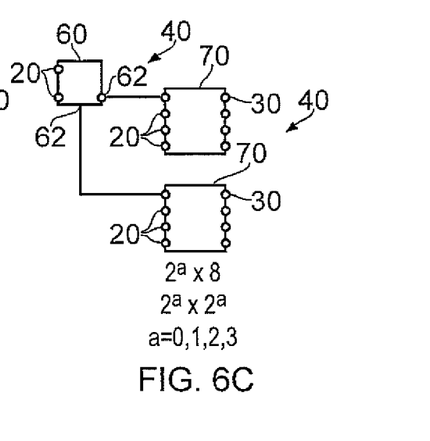

FIGS. 6A, 6B and 6C illustrate different arrangements of interconnections circuitry 40 formed from one or more modules 70.

The interconnection circuitry 70 in FIG. 6A comprises a single module 70 and the first ports A-D of the module 70 correspond to the radio ports 20 of the interconnection circuitry 40 and the second ports A'-D' of the module 70 correspond to the antenna ports 30 of the interconnection circuitry 40. The interconnection circuitry 40 is operable with $2^a$ radio ports 20, where a is selectable to be one of 0, 1, 2 and with $2^2$ antenna ports 30. Where phase compensation occurs, the four antenna ports 30 operate as $2^a$ virtual antenna ports where there is a one to one mapping between the virtual antenna ports and the operational radio ports 20.

The interconnection circuitry 70 in FIG. 6B comprises two modules 70 and the first ports A-D of the modules 70 correspond to the radio ports 20 of the interconnection circuitry and the second ports A'-D' of the modules 70 correspond to the antenna ports 30 of the interconnection circuitry 40. The interconnection circuitry 40 is operable with $2^a$ radio ports 20, where a is selectable to be one of 1, 2, 3 and with $2^3$ antenna ports 30. Where phase compensation occurs, the $2^3$ antenna ports 30 operate as $2^a$ virtual antenna ports where there is a one to one mapping between the $2^a$ virtual antenna ports and the $2^a$ operational radio ports 20.

The interconnection circuitry 70 in FIG. 6C is similar to that of FIG. 6B but additionally comprises selection circuitry 60 that has respective second ports 62 connected to the first ports A' of the respective modules 70. The first ports of the selection circuit 60 and the remaining first ports of the modules 70 provide the radio ports of the interconnection circuitry 40. The second ports of the modules 70 provide the antenna ports 30 of the interconnection circuitry 40. The interconnection circuitry 40 is operable with $2^a$ radio ports 20, where a is selectable to be one of 0, 1, 2, 3 and with $2^3$ antenna ports 30. Where phase compensation occurs, the $2^3$ antenna ports 30 operate as $2^a$ virtual antenna ports where there is a one to one mapping between the $2^a$ virtual antenna ports and the $2^a$ operational radio ports 20.

Figure 7:
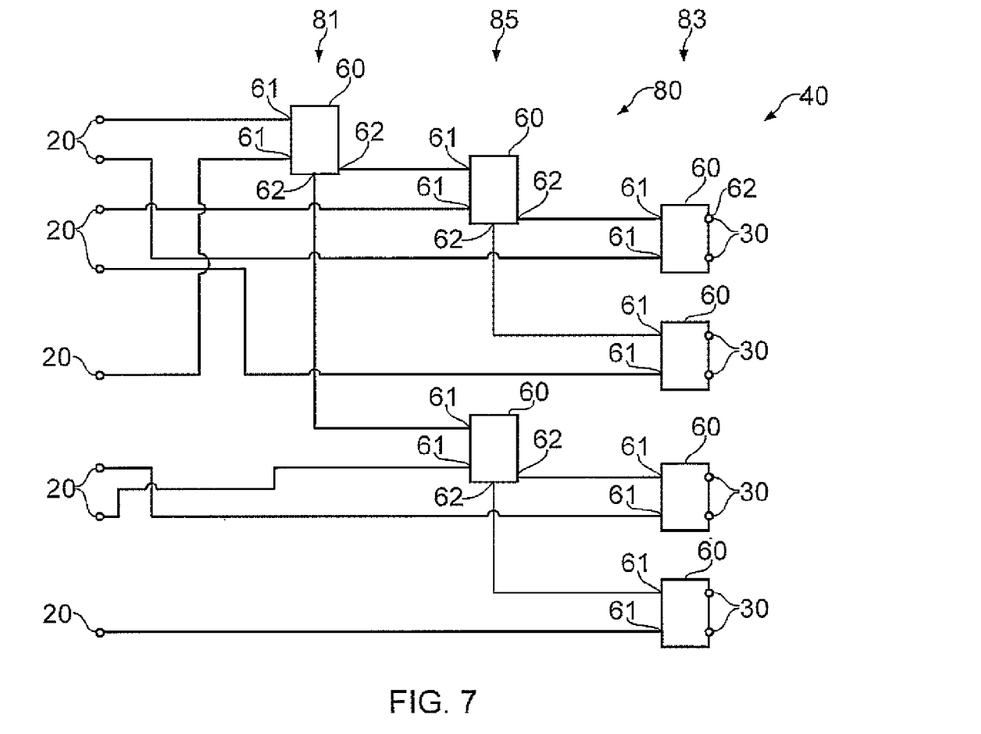
FIG. 7 illustrates an example of arrangement of selection circuits for interconnection circuitry.

FIG. 7 illustrates the arrangement of selection circuits 60 for interconnection circuitry 40 configured, for example, in a manner similar to FIG. 6C. However, in this example the ordering of the radio ports and the antenna ports have been changed such that there is sequential correspondence between the radio ports 20 and the antenna ports 30 when a=3.

The interconnection circuitry 40 comprises a cascade arrangement 80 of selection circuits 60. Each selection circuit 60 comprises two first ports 61 and two second ports 62 as previously described. Also as previously described each selection circuit 60 is configured to have a first configuration 71 (FIG. 4B) defined by one to one mappings between each of the first ports 61 and each of the two second ports 62 and is configured to have a second configuration 72 (FIG. 4C) defined by a one to two mapping between a first one of the two first ports 61 and the two second ports 62. The second of the first two ports 61 is connected to a radio port 20.

The cascade arrangement 80 comprises a radio tier 81 having a selection circuit 60. Each of the two first ports 61 of that selection circuit 60 are connected to a different radio port 20 and each of the two second ports 62 is connected to a first port of different selection circuit 60 in an adjacent lower order tier 85 of selection circuits 60.

The cascade arrangement 80 also comprises an antenna tier 83 of multiple selection circuits 60 having only one of the two first ports 61 connected to a radio port 20, the other first one of the first ports 61 being connected to a second port 62 of a selection circuit 60 in an adjacent higher order tier 85 and having each of the two second ports 62 connected to different antenna ports 30.

The cascade arrangement 80 also comprises an intermediate tier 85 of multiple selection circuits 60 having only one of the two first ports 61 connected to a radio port 20, the other of the two first ports 61 being connected to a second port 62 of a selection circuit 60 in an adjacent higher order tier 81 and having each of the two second ports 62 connected to a first one of the first ports 61 of different selection circuits 60 in an adjacent lower order tier 83.

Figure 8:
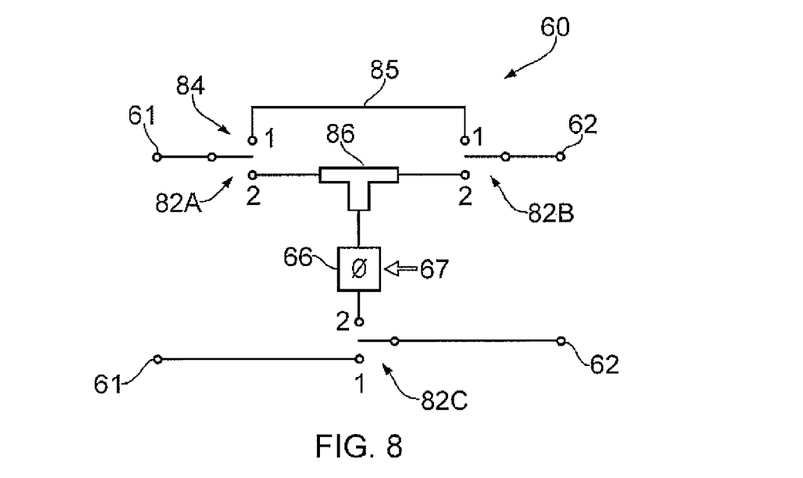
FIG. 8 illustrates an example of a selection circuit 60.

FIG. 8 illustrates an example of selection circuit 60. The selection circuit 60 comprises a bypass 84 configured in the first configuration to bypass a junction 86 and interconnect each of the two first ports 61 to the respective ones of the two second ports 62 and configured, in a second configuration, to couple a first one of the two first ports 61 to respective ones of the two second ports 62 via the junction 86. In the second configuration, the first one of the first ports 61 is coupled to one of the second ports 62 via a phase element 66 configured to control a differential phase introduced between the two second ports 62 by control signal 67.

The junction 96 may be a splitter/combiner as illustrated, a combiner, a splitter, or an active switch for example.

The control signal 67 may be an analog signal or a digital signal, or a mixture of both analog & digital and corresponding analog and/or digital circuitry and software may be used to provide the control signal 67.

Referring to FIG. 8, in the first configuration, a first switch 82A interconnects the first one of the first ports 61 to a first one of the second ports 62 via a second switch 82B. A third switch 82C interconnects a second one of the first ports 61 to a second one of the second ports 62.

In a second configuration, the first switch 82A interconnects the first one of the first ports 61 to a splitter/combiner 86, the second switch 82B interconnects the first one of the second ports 62 to the splitter/combiner 86 and the third switch 82C interconnects the second one of the second ports 62 to the splitter/combiner via the phase element 66.

In some embodiments the phase element 66 may have a fixed phase. In other embodiments, the phase element 66 may be programmable such that its phase may be varied via control signal 67

There may be passive/tunable/adaptive impedance matching elements anywhere between the antennas 44 and the next RF component (either a filter 66 or a splitter/combiner 86)

towards the radio circuitry 2. In some examples, a filter 66 may comprise passive/tunable/adaptive impedance matching elements.

Figure 9:
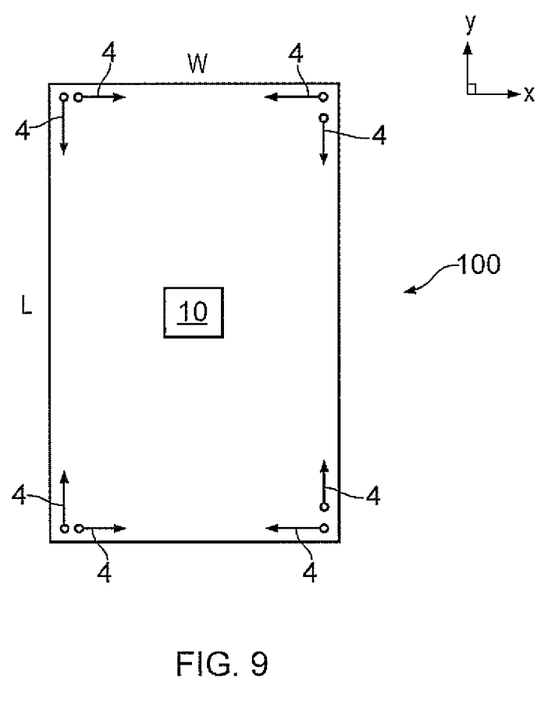
FIG. 9 illustrates an example of a communication apparatus comprising the apparatus.

FIG. 9 illustrates an example of a communication apparatus 100 comprising apparatus 10. The apparatus 100 is schematically illustrated in FIG. 2 and comprises multiple radio circuits 2, the apparatus 10 comprising interconnection circuitry 40 and multiple antennas 4. In this example, the multiple antennas 4 are configured for diversity. Each of the antennas 4 has diversity with respect to the other antennas. The diversity may, for example, arise from orientation. For example some of the antennas 4 are oriented in the +x direction, other antennas are oriented in the −x direction, other antennas are oriented in the +y direction and other antennas are oriented in the −y direction. The x and y directions are orthogonal and the +/− directions are parallel but in opposite sense ($\pi$ phase difference). For example some of the antennas 4 are physically separated in the x direction and other antennas are physically separated in the y direction.

In some of the examples described above it may be desirable to operate two antennas 4 as independent antennas operating in different communication channels. In other examples it may be desirable to operate the antennas as a single virtual antenna and in this latter case it may then be desirable to compensate for the phase differences introduced by diversity.

From the foregoing, it will therefore be appreciated that the interconnection circuitry 40 of the apparatus 10 may be configured to operate a plurality (Y) of antennas 4 interconnected with a shared radio port 20 as a single virtual antenna, for each of multiple (X) radio ports 20 to provide multiple input multiple output for X inputs and Y outputs, where Y and X are controllable via the interconnection circuitry 40.

While the above description has described aspects relating to multiple input and multiple output operation, it should also be appreciated that the interconnection circuitry has application in other uses.

The apparatus 100 may operate as a multiple antenna system, which may be used in a number of different applications. A multiple antenna system may, for example, be configured to operate the multiple antennas simultaneously.

A multiple antenna system may, for example, have multiple different antennas configured to operate at different frequencies or so that the system can operate in different frequency channels. A multiple antenna system may, for example, have multiple different antennas configured to operate in orthogonal channels created by orthogonal signal encoding. A multiple antenna system may, for example, have multiple different antennas configured to operate simultaneously in the same channel. Diversity may be introduced between the multiple antennas by, for example, arranging the antennas so that they have diversity arising from different orientations and/or spatial separation. Diversity may be modified and compensated for using the interconnection circuitry 40. The application of these various techniques may, for example, be used to create multiple input (MI), multiple output (MO) and multiple input multiple output (MIMO) systems. A MO system may, for example may be used for beam-forming, spatial multiplexing or diversity transmission. A MI system may, for example be used for determining a bearing (reverse beam-forming), spatial multiplexing reception or diversity reception.

In order to achieve the best diversity performance, correlation among the signals from each antenna 4 is minimized. This low correlation can be facilitated or attained by creating antenna radiation patterns, using the interconnection circuitry 40, that are either orthogonal in orientation and/or polarisation, or separated in distance and/or phase.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Where a structural feature has been described, it may be replaced by means for performing one or more of the functions of the structural feature whether that function or those functions are explicitly or implicitly described.

The apparatus 10, may for example, comprise: a plurality of radio port means for interconnection with radio circuits, a plurality of antenna port means for interconnection with antennas, interconnection means for enabling interconnection of each of one or more radio port means to different non-overlapping sets of P antenna port means, where P is controllable and $P=2^p$, p being a whole number; and at least one control port means configured to receive a control signal for determining P.

The radio port means may comprise any means that enables signal communication with the interconnection means. The radio port means may, for example, comprise one or more of transmission lines, connectors, couplers, circuit board contact pads, metal pins, spring loaded metal contacts, pogo pins, as a non-exhaustive list.

The interconnection means may comprise any means for interconnecting each of one or more radio port means to different non-overlapping sets of P antenna port means, where P is controllable and $P=2^p$, p being a whole number; in response to a received control signal that determines P.

The antenna means may be any suitable means for transferring electromagnetic energy between the air interface and the interconnection means.

The radio circuits 2 and the antennas 4 may be configured to operate in one or more of a plurality of operational resonant frequency bands. For example, the operational resonant frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-2483.5 MHz); hiper local area network (HiperLAN) (5150-5850 MHz); global positioning system (GPS) (1570.42-1580.42 MHz); US—Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting-handheld (DVB-H) (470-702 MHz); DVB-H US (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultra high frequency (RFID UHF) (433 MHz, 865-956 MHz, 2450 MHz).

A frequency band over which an antenna can efficiently operate is a frequency range where the antenna's return loss is less than an operational threshold. For example, efficient operation may occur when the antenna's return loss is better than (that is, less than) −4 dB or −6 dB.

An operational resonant mode (operational bandwidth) is a frequency range over which an antenna can efficiently operate. An operational resonant mode (operational bandwidth) may be defined as where the return loss S11 of the antenna is greater than an operational threshold T such as, for example, 3 or 4 dB and where the radiated efficiency is greater than an operational threshold such as for example −3 dB in an efficiency plot. Radiation efficiency is the ratio of the power delivered to the radiation resistance of the antenna (Rrad) to the total power delivered to the antenna: er= (Rrad)/(RL+Rrad), where RL=loss resistance (which covers dissipative losses in the antenna itself). It should be understood that "radiation efficiency" does not include power lost due to poor VSWR (mismatch losses in the matching network which is not part of the antenna as such, but an additional circuit). The "total radiation efficiency" comprises the "radiation efficiency" and power lost due to poor VSWR [in dB]. The efficiency operational threshold could alternatively be expressed in relation to "total radiation efficiency" rather than "radiation efficiency".

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a plurality of radio ports for interconnection with radio circuits,
a plurality of antenna ports for interconnection with antennas,
interconnection circuitry configured to enable interconnection of each of one or more radio ports to different non-overlapping sets of P antenna ports, where P is controllable and $P=2^p$, p being a whole number; and
at least one control port configured to receive a control signal for determining P.

2. The apparatus of claim 1, wherein the circuitry is configured to interconnect each antenna port to one of the plurality of radio ports irrespective of the value of P.

3. The apparatus of claim 1 wherein the interconnection circuitry is configured to provide different phase compensation between different pairs of radio ports and antenna ports, to enable phase compensation in respect of multiple antenna ports interconnected to a shared radio port.

4. The apparatus of claim 1 wherein the interconnection circuitry is configured to provide programmable phase compensations between different pairs of radio ports and antenna ports.

5. The apparatus of claim 1 wherein the interconnection circuitry comprises one or more selection circuits, each selection circuit comprising first ports and second ports and configured to adopt a first configuration defined by one to one mappings between the first ports and the second ports, and configured to adopt a second configuration defined by 1 to $2^q$ mappings between the first ports and the second ports, where q is a non-negative integer, wherein the at least one control port is configured to receive a control signal for controlling configurations of the one or more selection circuits.

6. The apparatus of claim 1 wherein the interconnection circuitry comprises a cascade arrangement of selection circuits, wherein each selection circuit comprises two first ports and two second ports and is configured to have a first configuration defined by one to one mappings between each of the two first ports and each of the two second ports are configured to have a second configuration defined by a 1 to 2 mapping between one of the two first ports and the two second ports.

7. The apparatus of claim 6, wherein the cascade arrangement comprises:
a radio tier of one or more selection circuits having each of the two first ports connected to a different radio port and each of the two second ports is connected to a first port of different selection circuits in an adjacent lower order tier of selection circuits; and
an antenna tier of multiple selection circuits having only one of the two first ports connected to a radio port, the other of the two first ports being connected to a second port of a selection circuit in an adjacent higher order tier and having each of the two second ports connected to different antenna ports.

8. The apparatus of claim 7, wherein the cascade arrangement comprises at least one intermediate tier of multiple selection circuits having only one of the two first ports connected to a radio port, the other of the two first ports being connected to a second port of a selection circuit in an adjacent higher order tier and having each of the two second ports connected to a first port of different selection circuits in an adjacent lower order tier.

9. The apparatus of claim 5, wherein each selection circuit comprises a by-pass configured, in the first configuration, to bypass a splitter and/or combiner element and couple each of the two first ports to respective ones of the two second ports and configured, in the second configuration, to couple one of the two first ports to respective ones of the two second ports via the splitter and/or combiner element.

10. The apparatus of claim 5, wherein each selection circuit comprises a phase element configured to control a phase introduced between the two second ports.

11. The apparatus of claim 10, wherein the phase element has a programmable phase.

12. The apparatus of claim 1, further comprising a plurality of antennas each of which is interconnected with an antenna port, wherein the plurality of antennas are configured for diversity.

13. The apparatus of claim 12, wherein at least some of the antennas are aligned in orthogonal directions and at least some of the antennas are spatially separated.

14. The apparatus of claim 1, wherein the interconnection circuitry is configured to operate a plurality (Y) of antennas interconnected via the interconnection circuitry with a shared radio port as a single virtual antenna, for each of multiple (X) radio ports to provide multiple input multiple output, wherein X is controllable.

15. A method comprising:
receiving a control signal by a radio communication apparatus comprising one or more operational radio ports and one or more antenna ports; and
interconnecting by the radio communication apparatus each of the one or more operational radio ports to different non-overlapping sets of antenna ports, in dependence upon the control signal.

* * * * *